Nov. 28, 1950     A. J. LEWIS     2,531,819
REVERSIBLE RATCHET DRIVE MECHANISM
FOR POWER VEHICLES
Filed June 3, 1948
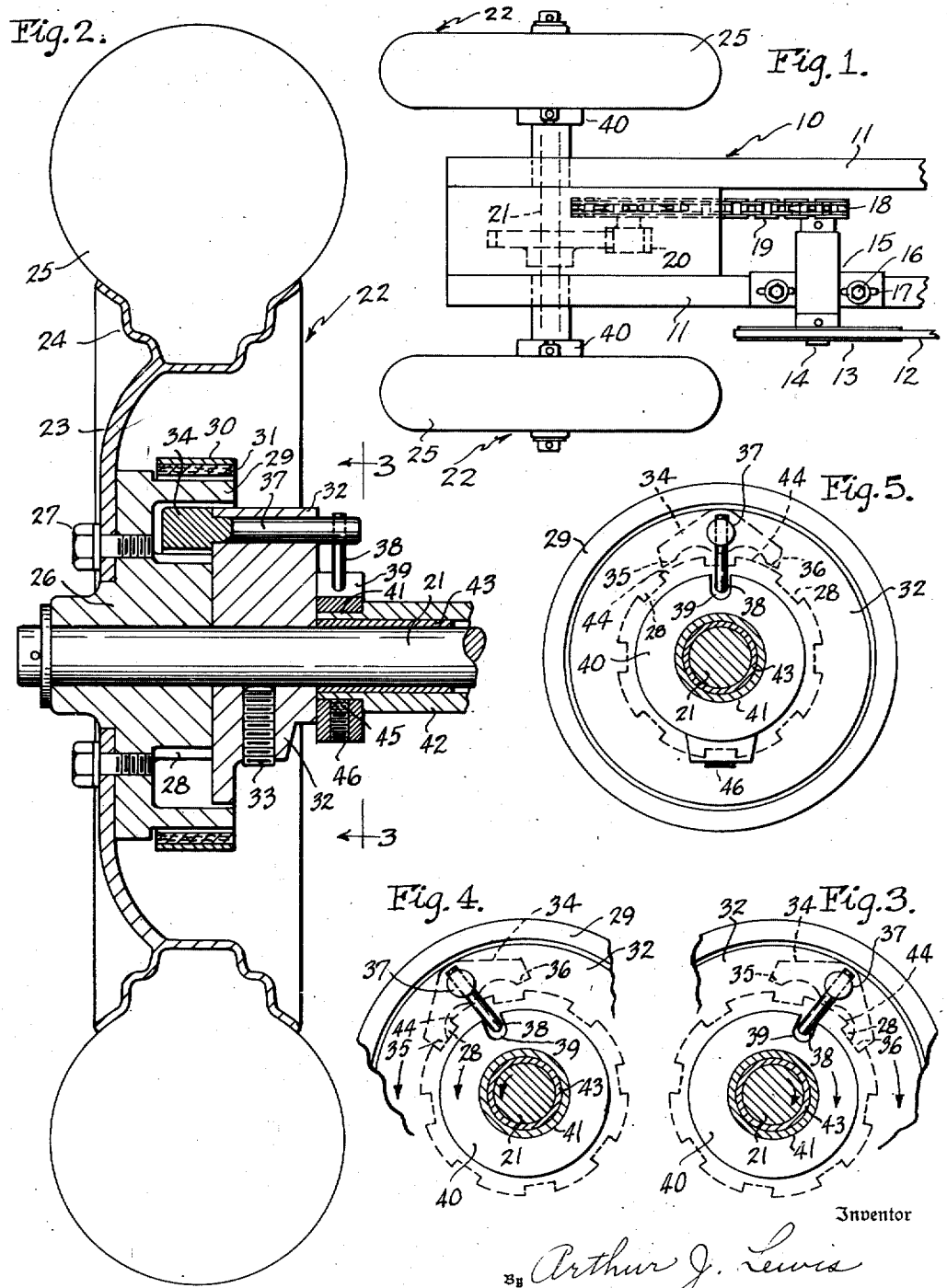
Inventor
By Arthur J. Lewis
Wooster & Davis    Attorneys Patented Nov. 28, 1950

2,531,819

UNITED STATES PATENT OFFICE 2,531,819

REVERSIBLE RATCHET DRIVE MECHANISM FOR POWER VEHICLES

Arthur J. Lewis, Stratford, Conn., assignor to The Baird Machine Company, Stratford, Conn., a corporation of Connecticut Application June 3, 1948, Serial No. 30,771

12 Claims. (Cl. 192—50)

This invention relates to a reversing ratchet drive, particularly to a ratchet drive adapted for use in small tractors, such, for example, as small hand tractors used by gardeners for operating various devices such as cultivators and the like.

These small tractors are not ordinarily provided with a conventional differential rear drive like that used for automobiles or large tractors, because they are too expensive, so that the general practice is to either fasten the two rear wheels rigid on the rear drive shaft for these wheels, or to use a plain ratchet drive from the shaft to each wheel. With the first arrangement, in turning of the tractor about a corner or curve, one wheel must slip on the ground, and with the plain ratchet drive there can be no reverse or backing up of the tractor because the ratchets work in one direction only.

It is, therefore, an object of the present invention to provide a ratchet drive for the rear wheels of this type of tractor which will permit differential rotation of one wheel faster than the other when going around a curve or corner, and will also provide a reversing drive for backing-up operation.

It is also an object to provide such a drive which is of very simple construction and involves a minimum number of parts, and which will operate automatically.

With the foregoing and other objects in view, I have devised the construction illustrated in the accompanying drawing forming a part of this specification. It is, however, to be understood the invention is not limited to the specific details of construction and arrangement shown, but may embody various changes and modifications within the scope of the invention.

In the drawing:

Fig. 1 is a top plan view showing somewhat diagrammatically the rear portion of a small tractor;

Fig. 2 is an enlarged section through one wheel and the drive means therefor;

Fig. 3 is a detail view partly in elevation and partly in section, the plane of the section being substantially on line 3—3 of Fig. 2, showing the parts in the position of driving in one direction, for example, forwardly;

Fig. 4 is a similar view showing the position of the parts when driving in the opposite direction or in reverse, and Fig. 5 is a similar view showing the parts in the intermediate position, permitting overrunning of one wheel with respect to the other.

In Fig. 1 the rear portion of the frame of a tractor is indicated at 10, comprising spaced side members 11 which may be of any suitable shape or cross section, such, for example, as channel members, and on this is mounted the drive from the internal combustion engine (not shown) usually located at the forward part of the frame. A drive belt from this engine is indicated at 12 running over a driven pulley 13 on a shaft 14 mounted in a suitable bearing 15 secured to the frame by any suitable means, preferably for longitudinal adjustment on the frame to properly position the shaft and the pulleys. In the present showing it is secured by clamping bolts 16 passing through elongated slots 17. On the other side of the bearing from the pulley 13 a sprocket 18 is mounted on the shaft operating through a suitable chain drive 19 to a gear drive 20 for the rear axle or shaft 21 of the rear wheels 22. A section through the drive or mounting for one of these wheels, in this case the left hand wheel, is shown in Fig. 2, although the same drive is used for the right hand wheel, but the latter wheel is reversed. The wheel may comprise any suitable construction, but that shown comprises the disc 23 with a suitable rim 24 mounting the tire 25, the disc being mounted on a hub 26 by means of screws 27. This hub 26 is free to turn on the drive shaft 21 which is operated from the motor driven drive as described. The hub 26 is provided with a series of notches or recesses 28 forming part of a ratchet drive, and these may be enclosed in and spaced from a brake drum 29 of larger diameter and which may be embraced by any suitable type of brake 30 having the usual friction lining 31, adapted to be operated by any suitable mechanism (not shown) to engage the brake drum for braking action.

Mounted on the shaft 21 at the inner side of the hub 26 is a block 32, and this block is rigidly secured to the shaft 21 by any suitable means, that shown in the present case being a set screw 33. Pivotally mounted in the block 32 is one or more pawls 34, ordinarily only a single pawl being all that is necessary, although more than one may be employed if found desirable or necessary. This pawl is located within the space between the ratchet portion 28 of the hub 26 and the brake drum 29, and is provided at its opposite ends with lugs 35 and 36 adapted to seat in the notches 28 to effect a driving connection between the pawl and the ratchet. The pawl 34 is mounted in the block 32 by means of a shaft 37 extending through the block, and at its opposite end is provided with a laterally extending pin 38 extending into a notch 39 in a collar 40, which collar is mounted to turn on a bearing 41 provided on a stationary housing 42 enclosing the shaft 21. The shaft may rotate in any suitable type of bearing in this housing, such, for example, as a bronze bushing 43. As stated above, there is one of these drives for each wheel, but the opposite wheel will be reversed on the shaft.

In operation, in driving the tractor straight ahead the drive from the engine to the shaft or rear axle 21 will rotate this shaft forwardly or clockwise, as viewed in Figs. 3, 4 and 5. As it does so it will turn the block 32 with it, as this block is rigid on the shaft, and will carry the pawl 34 forwardly a short distance with respect to the hub 26. As it does so, and due to the inherent friction between the collar 40 and its bearing 41 on the stationary housing 42, this collar will not turn immediately but will remain stationary for a short time. Therefore, as the pawl 34 moves forwardly, and as the pin 38 of the pawl is in the notch 39 in this collar 40, it will be apparent from Fig. 3 that the lagging behind of the collar 40 swings the pin 38 to the left and therefore swings the pawl 34 to the right to swing the right hand end or lug 36 of this pawl inwardly to cause it to seat in one of the notches 28 in the ratchet on the hub 26, as shown in Fig. 3. This connects the pawl 34, which, through the block 32 is mounted rigid on the drive shaft 21, to the hub 26 and therefore drives the wheel forwardly with the block 32 and shaft 21, as indicated by the arrows in Fig. 3. However, as the pin 38 remains in the notch 39, continued movement of the pawl clockwise carries with it the collar 40 through action of the pin 38, so that this collar now turns with the wheel on its bearing 41 on the housing. As there is some friction between this collar and the stationary bearing, the collar always tends to lag behind the block 32 and the pawl 34, and therefore retains the lug 36 in the notch 28 to maintain this driving connection.

If it is now desired to reverse the drive, or that is, drive the tractor backwardly, the drive mechanism from the motor is reversed to drive the rear axle or shaft 21 in the opposite direction, or counterclockwise as viewed in Figs. 3, 4 and 5. As the pawl 34 is on the block 32 secured on the shaft 21, this is also driven counterclockwise, but as previously stated, as the collar 40 has some friction in bearing 41 it does not reverse immediately but lags behind so that it swings the pin 38 to the right or in the opposite direction as viewed in Fig. 4, and swings the pawl 34 counterclockwise to seat its other lug 35 in one of the notches 28 of the ratchet on the hub. Therefore, it will drive the wheel counterclockwise or backward, and as the collar 40 still has some friction on its bearing 41, in the backward direction the same as in the forward direction, it acts through the pin 38 to hold the pawl in this position, although the collar follows around with it.

Should the tractor be turned in either direction, such, for example, as a right hand turn as viewed in Fig. 1, the left or outside wheel rotates faster than the right or inside wheel. Therefore the left wheel runs ahead of the drive shaft 21. In doing this, it shifts the ratchet with the notches 28 ahead faster, or clockwise as viewed in Figs. 3 and 5, than rotation of the shaft 21, and movement of the pawl 34. In other words, the rib 44 of the notch 28 in which the lug 36 is located, as indicated in Fig. 3, moves forward somewhat faster than pawl 34 and pushes this lug 36 outwardly and out of the notch 28 to the position of Fig. 5. In doing so, it acts through the pin 38 to shift the collar 40 sufficiently clockwise to carry it along with it, even though the pawl is released, and the pawl will remain in the intermediate or released position of Fig. 5 as long as the wheel with the notched member 26 runs faster than the pawl, but as soon as the wheel slows up then the lagging of the collar 40 behind again swings the pawl so that it again catches in a ratchet notch 28 to drive the wheel. A similar action occurs if the wheel rotates faster in the reverse direction than the drive shaft to release the pawl from the reverse position of Fig. 4, except that in this case the rib 44 will force the lug 35 outwardly from the notch in the ratchet to release the pawl.

In ordinary operation, there is sufficient friction between the collar 40 and the bearing 41 of the stationary housing 42 to effect the operation described. However, should it be thought desirable, an auxiliary friction device may be provided, such, for example, as a leather friction plug 45, may be mounted in the collar to engage the bearing, and its pressure on the bearing, and, therefore, its frictional effect, may be adjusted by a screw 46.

It will be understood from the above that this device provides a very simple and effective ratchet drive for such devices as small tractors; that it readily permits reversing of the drive and driving the tractor backwardly, and it also permits overrunning of one wheel with respect to the other so that it is not necessary to rely on slipping of the wheel on the ground in making turns or going around corners.

Having thus set forth the nature of my invention, I claim:

1. A drive for a tractor wheel including a drive shaft, means for driving said shaft, a hub mounted to turn on the shaft, a block at one side of the hub secured on the shaft to be turned by the shaft, a ratchet on the hub comprising a series of spaced shoulders arranged around the hub, a pawl pivotally mounted in the block and comprising spaced lugs on opposite sides of its pivot adapted to engage said shoulders to drive the hub in opposite directions, a stationary housing enclosing the shaft and provided with a bearing, a collar mounted to turn on said bearing and provided with spaced shoulders, and an extension connected with the pawl and extending between said shoulders to swing the pawl on its pivot to engage the ratchet by retarding action of the collar on said extension as the block turns with the shaft.

2. A drive of the character described comprising a driving shaft, a hub mounted to turn freely on the shaft including a ratchet extending around its periphery comprising spaced ribs and recesses, a block secured to the shaft to rotate with it, a pawl pivoted to the block and provided with a lug spaced from the pivot to engage in said recesses to drive the hub, a stationary member provided with a bearing, a collar mounted to rotate on said bearing, and a crank member connected with the pawl and the collar to swing the pawl by lagging action of the collar on its bearing as the block rotates.

3. A drive of the character described comprising a driving shaft, a hub mounted to turn freely on the shaft including a ratchet extending around its periphery comprising a series of spaced ribs, a block secured to the shaft to rotate with it, a pawl pivotally mounted on the block and provided with a lug spaced from the pivot to engage the ribs to drive the hub, a member mounted to rotate on a stationary bearing coaxial with the shaft, and a crank arm connected to the pawl to swing it on its pivot and at its free end connected to said member and operated by said member due to its friction with its bearing.

4. A drive of the character described comprising a driving shaft, a hub mounted to turn freely on the shaft including a ratchet extending around its periphery comprising a series of spaced ribs, a block secured to the shaft to rotate with it, a pawl pivotally mounted on the block and adapted to engage said ribs to drive the hub, a stationary bearing concentric with the shaft, a member mounted to turn on said bearing independently of the shaft and to lag behind the shaft by its friction with the bearing, and a crank arm connected with the pawl to swing it on its pivot and connected at its free end to said member so that said lag will swing the pawl to engage the ratchet.

5. A drive of the character described comprising a driving shaft, a hub mounted to turn freely on the shaft including a ratchet extending around its periphery comprising a series of spaced ribs, a block secured to the shaft to rotate with it, a pawl pivotally mounted on the block and adapted to engage said ribs to drive the hub, a stationary bearing concentric with the shaft, a member mounted to turn on said bearing independently of the shaft and to lag behind the shaft by its friction with the bearing, and a crank arm connected with the pawl to swing it on its pivot and connected at its free end to said member so that said lag will swing the pawl to engage the ratchet, said pawl being located in front of a rib of the ratchet when in driving engagement with the ratchet, and said pawl and rib being provided with cooperating camming surfaces to shift the pawl out of engagement with the ratchet as the rib is shifted against the pawl by rotation of the hub faster than the shaft and block.

6. A drive of the character described comprising a driving shaft, a hub mounted to turn freely on the shaft including a ratchet extending around its periphery comprising a series of spaced ribs, a block secured to the shaft to rotate with it, a pawl pivotally mounted on the block and provided with means at its opposite ends on opposite sides of the pivot to engage said ribs of the ratchet to rotate the hub, a stationary housing about the shaft provided with a bearing, a collar mounted on said bearing to turn independently of the shaft, and a crank arm connected to the ratchet and at its free end connected to the collar to swing the ratchet by lag of the collar on its bearing behind the shaft.

7. A drive of the character described comprising a driving shaft, a hub mounted to turn freely on the shaft including a ratchet extending around its periphery comprising a series of spaced ribs, a block at one side of the hub and secured to the shaft to rotate with it, a ratchet including a pivot pin extending through the block and arms extending in opposite directions from said pin provided with means to engage the ratchet to drive the hub, a stationary housing embracing the shaft and provided with a bearing, a collar on said bearing on the opposite side of the block from the hub and free to turn on said bearing, and a crank arm mounted on said pawl pin and connected at its free end with the collar to swing the pawl because of lag of the collar on its bearing.

8. A drive of the character described comprising a driving shaft, a hub mounted to turn freely on the shaft including a ratchet extending around its periphery comprising a series of spaced ribs, a block at one side of the hub and secured to the shaft to rotate with it, a ratchet including a pivot pin extending through the block and arms extending in opposite directions from said pin provided with lugs to engage the ribs of the ratchet to drive the hub, a stationary housing embracing the shaft and provided with a bearing, a collar free to turn on said bearing on the opposite side of the block from the hub and provided with a recess in its periphery, a crank arm mounted on the pawl pivot pin and extending at its free end into the recess in the collar, the pawl being located in front of a rib of the ratchet when in driving position, and the pawl and rib being provided with cooperating camming surfaces to shift the pawl out of driving position as the rib is shifted against the pawl by rotation of the hub at greater speed than the shaft.

9. A drive of the character described comprising a driving shaft, a hub mounted to turn freely on the shaft including a ratchet extending around its periphery comprising spaced ribs and recesses, said hub being also provided with a brake drum embracing the ratchet and spaced outwardly therefrom, a friction brake embracing the drum, a block secured to the shaft at one side of the hub to rotate with the shaft, a pawl located in the space between the ratchet and drum and adapted to engage the ratchet to drive the drum, said pawl including a pivot pin extending through the block to mount the pawl on the block, a stationary housing embracing the shaft provided with a bearing, a collar on the bearing and free to turn thereon, and a crank arm mounted on said pivot pin and connected at its free end with the collar so as to be operated by the collar to swing the pawl by lag of the collar behind the shaft due to its friction on the bearing.

10. A drive of the character described comprising a driving shaft, laterally spaced hubs mounted to turn freely on the shaft, a ratchet drive between the shaft and each hub comprising a block secured on the shaft to rotate with it, ratchet teeth arranged about the periphery of the hub and a pawl pivoted on the block and provided with oppositely extending arms adapted to alternately engage the ratchet teeth to drive the hub in either direction, rotatable means mounted to lag by friction behind rotation of the block, and means connecting the block to the pawl to turn the pawl to different positions.

11. A drive of the character described comprising a drive shaft, laterally spaced hubs mounted to turn freely on the shaft, a ratchet drive between the shaft and each hub comprising a block secured on the shaft to rotate with it, ratchet teeth arranged about the periphery of the hub and a double ended pawl pivotally mounted on the block adapted to alternately engage the teeth to drive the hub in either direction, and means having differential movement with respect to the block and connected with the pawl to shift the pawl by said movement.

12. A drive of the character described comprising a drive shaft, laterally spaced hubs mounted to turn freely on the shaft, a ratchet drive between the shaft and each hub comprising a block secured on the shaft to rotate with it, a ratchet drive between the block and hub including a movable pawl arranged to drive the hub in either direction for forward and reverse movement, means operable by differential movement between the block and hub to shift the pawl to either driving position, and means operable by an overrunning movement of the hub with respect to the block to release the pawl.

ARTHUR J. LEWIS.

REFERENCES CITED

The following references are of record in the file of this patent:

UNITED STATES PATENTS

| Number | Name | Date |
|---|---|---|
| 1,406,211 | Myers | Feb. 14, 1922 |
| 1,469,700 | Sheldon | Oct. 2, 1923 |

FOREIGN PATENTS

| Number | Country | Date |
|---|---|---|
| 8,176 | Great Britain | Apr. 20, 1901 |